United States Patent [19]
DeCaro

[11] 3,924,508
[45] Dec. 9, 1975

[54] COMPOSITE DRILL SCREW

[75] Inventor: Charles J. DeCaro, Brighton Township, Beaver County, Pa.

[73] Assignee: Textron Inc., Providence, R.I.

[22] Filed: Sept. 27, 1974

[21] Appl. No.: 510,115

[52] U.S. Cl.................. 85/41; 10/10 R; 10/27 R; 85/9 W
[51] Int. Cl.².................... F16B 23/00; F16B 25/00
[58] Field of Search......... 85/41, 47, 9 W, 9 R, 1 R, 85/1 P; 10/10 R, 27 R, 152 T, 152 R; 408/226

[56] References Cited
UNITED STATES PATENTS

| 1,765,516 | 6/1930 | Whitney | 10/27 R |
| 2,153,702 | 4/1939 | Tighe | 85/9 R X |
| 3,585,894 | 6/1971 | Brown | 85/41 |
| 3,611,862 | 10/1971 | Walker | 85/9 R |

*Primary Examiner*—Ramon S. Britts
*Attorney, Agent, or Firm*—Webb, Burden, Robinson & Webb

[57] ABSTRACT

A composite drill screw comprises two components of different material joined together by an inertia weld. The first component is the head or the head and a portion of the threaded shank or the head and the threaded shank; whereas the second component is the threaded shank and the cutting end or the remaining portion of the threaded shank and the cutting end or the cutting end, respectively. The head can be recessed to accommodate the inertia weld and the shank in that particular embodiment.

4 Claims, 4 Drawing Figures

COMPOSITE DRILL SCREW

FIELD OF THE INVENTION

This invention relates to drill screws and, more particularly, to composite drill screws of differing materials joined through an inertia weld.

DESCRIPTION OF THE PRIOR ART

The growing drill screw technology has resulted in wider and wider applications of that particular type of fastener. In addition, the replacement of wood by metal construction materials for siding, roofing, decking and the like has further expanded the usage of drill screws.

One of the problems that has arisen with the increased usage of drill screws is the need for widely varying properties and characteristics for different parts of the same drill screw. For example, the exposed head must often be protected from weathering while the cutting end must be extremely hard to penetrate through the workpieces being joined. At the same time the intermediate threaded section may have to have a high holding strength or a hard surface for forming threads in the hole or be corrosion resistant if a portion of the threaded section is exposed to corrosive conditions. Materials having such diverse properties are either not available or are extremely rare and expensive. Further, the heat treatments employed to obtain one set of properties along one portion of the drill screw can be detrimental to the requisite properties of a different portion of the drill screw.

Rivets have been constructed of two separate components joined by an inertia weld for use in the aerospace industry, but no one has considered this approach for drill screws which represents a different technology and a usage unrelated to rivets and aerospace.

SUMMARY OF THE INVENTION

My invention permits different sections of a drill screw to possess widely varying properties and characteristics as compared to adjacent sections. My invention provides different metals within a drill screw so that corrosion characteristics can be obtained as well as strength characteristics. My invention also provides a drill screw in which the sections can be heat treated separately before joining or integrally after joining of the sections. This heat treating alternative permits even wider ranges of properties. Where abnormal properties normally associated with expensive and hard to get metals are needed for a particular purpose, my invention provides for the utilization of such a metal, but only as a portion of the drill screw, thereby minimizing the material cost and obtention problem. The use of separate components further permits the maximum utilization of spray coating, if desired.

My invention is a composite drill screw in which a first portion of the drill screw of a first material is joined through an inertia weld to the remaining portion of the drill screw of a second material. The inertia weld can be positioned between the head and the threaded shank, between the threaded shank and the cutting section or along the threaded shank.

DESCRIPTION OF THE PREFERRED EMBODIMENTS

My drill screw, generally designated 10, is a composite made of at least two sections joined by an inertia weld. The drill screw 10 includes a head section, a threaded shank section and an entry section which includes the drill point.

Figure 1:
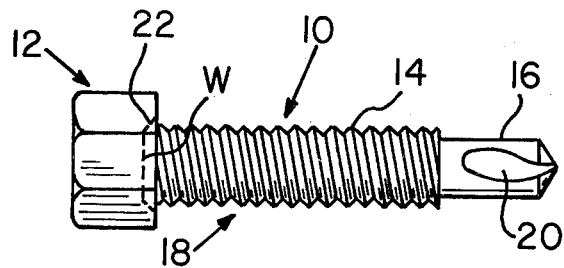
FIG. 1 is an elevation of my drill screw joined adjacent the head.
Figure 2:
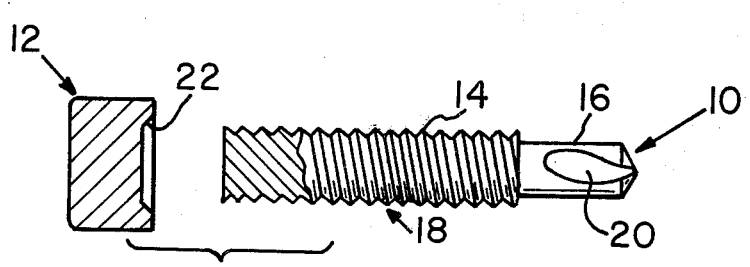
FIG. 2 is an exploded view of the drill screw of FIG. 1.

In FIGS. 1 and 2, I have illustrated my drill screw 10 in which the inertia weld is made between the head section 12 and the threaded shank and entry section 18. Specifically, drill screw 10 comprises hex head 12, threaded shank 14 and entry end 16. Shank 14 is perimetrically threaded and entry end 16 includes a drill point 20 of a type common to drill screws.

Head 12 includes a chamfered recess 22 along the undersurface thereof, FIG. 2. The head 12 is joined to the shank 14 through an inertia weld W. The joint is formed within the recess 22 so that the flash which forms from the inertia weld is retained in the recess 22 and a minimum, if any, flash removing operation need be conducted. It is normally difficult to roll form threads right up to the drill screw head. With this embodiment, the threads can start immediately from the head to insure maximum thread engagement.

Head 12 is normally a metal having desirable corrosion resistance whereas the shank 14 and entry end 16 are a metal having strong threads and a hard drill point. Shank 14 and entry end 16 are normally formed from a single blank in a cold heading operation or the like.

Figure 3:
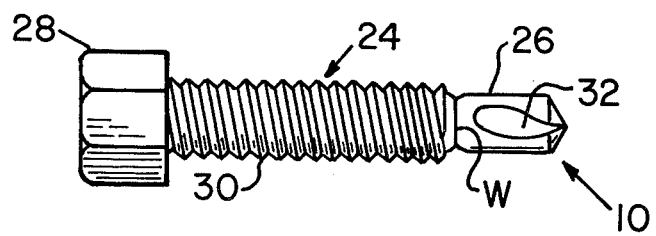
FIG. 3 is an elevation of my drill screw joined adjacent the cutting section.

In a similar manner drill screw 10 can be formed by joining through an inertia weld the entry end of a first metal to a head and shank of a second metal, FIG. 3. Such an application could be used where an extremely hard drill point is required or where a substantial portion of the head and shank run the risk of exposure to a corrosive environment. Specifically, head and shank section 24 is joined to the entry section 26 through the inertia weld W. Section 24 includes head 28 integrally formed with threaded shank 30 by a normal cold heading and thread roll forming operation. Entry section 26 includes drill point 32 and entry section 26 is likewise formed in a cold heading or similar operation.

Figure 4:
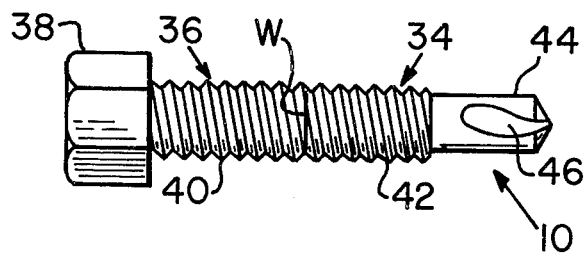
FIG. 4 is an elevation of my drill screw joined along the threaded shank.

The inertia weld W can also be utilized to join a threaded and entry section 34 to a head and threaded section 38, FIG. 4. In such a case, section 36 includes the head 38 and an integrally formed portion of the shank 40. The remainder of the shank 42 is integrally formed with the entry end 44 which includes the drill point 46. Shank 40 is then joined to shank 42 through inertia weld W. Normally in this embodiment the drill screw 10 is thread rolled and subsequently heat treated after shank 40 has been inertia welded to shank 42. In the earlier two embodiments welding normally takes place after the respective sections receive the desired heat treatment. This processing step can be altered, however, depending on the ultimate requirements of the drill screw.

The following Table 1, while not limiting, illustrates some possible combinations of metals which can be employed for the three embodiments illustrated heretofore. In addition spray coating can be utilized quite effectively. For example, a conventional steel head can be spray coated with a corrosion resistant material and inertia welded to a shank of a hardened carbon steel. Or a metal which is difficult to inertia weld may be spray coated on a conventional metal head and the heat developed during the joining of the two components will melt the thin spray coated layer and weld the shank to the bare metal of the head.

TABLE 1

ILLUSTRATIVE METAL COMBINATIONS
Material Options

| Inertia Weld Location | Head | Shank | Entry End |
| --- | --- | --- | --- |
| Head to Shank | 300 series stainless steel, Monel, Al alloys, Inconel, Cu-Ni alloys | (1020 to 1050 carbon steel) (400 series stainless steel) | |
| Shank to Entry End | | (304 and higher series stainless steel) (Monel, Cu-Ni alloys, Al alloys) | 1020 to 1050 carbon steel |
| | | | 400 series stainless steel |
| Shank to Shank | | 321 stainless steel (medium to high carbon steels) (400 series stainless steel) | |

The inertia welding is conducted on friction welding apparatus such as that described in U.S. Pat. No. 3,804,318, capable of handling small objects. The inertia weld is normally achieved by rotating one of the sections at extremely high rotational speeds often approaching 100,000 rpm, holding the other section in a nonrotatable position and thereafter bringing the sections together so as to convert the rotational energy into heat by means of the frictional forces developed as a result of the contact.

Having thus described my invention with the detail and particularity required by the patent laws, what is desired protected by Letters Patent is set forth in the following claims.

I claim:

1. An inertia welded composite screw comprising a threaded shank section of a first material terminating in an entry end and a head section of a second material different from the first material, said head section having a recess along a surface thereof, said recess having a greater cross section than the shank cross section, said shank section positioned within the recess and joined to the head section through an inertia weld zone substantially within said recess.

2. An inertia welded composite drill screw comprising a threaded shank section of a first metal terminating in a cutting end and a head section of a second metal different from the first metal, said head section having a recess along a surface thereof, said recess having a greater cross section than the shank cross section, said shank cross section positioned within the recess and joined to the head section through an inertia weld zone substantially within said recess.

3. The drill screw of claim 2 wherein said threads of the shank extend substantially to the surface of the head having the recess.

4. The drill screw of claim 2 wherein said fusion zone is of a cross section between that of the recess and of the shank.

* * * * *